United States Patent [19]

Cole, Jr. et al.

[11] 4,122,027

[45] Oct. 24, 1978

[54] DICHROIC LIQUID CRYSTAL COMPOSITION WITH 4,4-BIS (SUBSTITUTED NAPHTHYLAZO)AZOBENZENE DICHROIC DYES

[75] Inventors: Herbert S. Cole, Jr., Scotia; Siegfried Aftergut, Schenectady, both of N.Y.

[73] Assignee: General Electric Company, Schenectady, N.Y.

[21] Appl. No.: 739,629

[22] Filed: Nov. 8, 1976

[51] Int. Cl.$^2$ .............................. C09K 3/34; G02F 1/13
[52] U.S. Cl. .................................. 252/299; 252/408; 260/152; 260/169; 260/170; 350/349
[58] Field of Search ................ 252/299, 408; 350/160 LC, 349; 260/169, 170, 152

[56] References Cited

U.S. PATENT DOCUMENTS

| | | | |
|---|---|---|---|
| 3,597,044 | 8/1971 | Castellano | 252/299 |
| 3,703,329 | 11/1972 | Castellano | 252/299 |
| 3,833,287 | 9/1974 | Taylor et al. | 252/299 |
| 3,864,022 | 2/1975 | Moriyama et al. | 252/299 |
| 3,960,750 | 6/1976 | Moriyama et al. | 252/299 |
| 3,960,751 | 6/1976 | Moriyama et al. | 252/299 |
| 4,032,219 | 6/1977 | Constant et al. | 252/299 |

FOREIGN PATENT DOCUMENTS

| | | | |
|---|---|---|---|
| 2,627,215 | 1/1977 | Fed. Rep. of Germany | 252/299 |
| 1,459,046 | 12/1976 | United Kingdom | 252/299 |

OTHER PUBLICATIONS

Constant, J., et al., "Pleochroic Dyes with High Order Parameters," presented at 6th Int. L. C. Conf., Kent, Ohio (Aug. 23-27, 1976).
White, D. L., et al., J. Appl. Phys., vol. 45, No. 11, pp. 4718-4722 (Nov. 1974).
Bloom, A., et al., Mol. Cryst. Liq. Cryst., vol. 40, pp. 213-221 (1977).
Bloom, A., et al., Abstracts 6th Int. L. C. Conf., K-12 (Aug. 23-27, 1976).
Bloom, A., et al., Mol. Cryst. Liq. Cryst., vol. 41, No. 1, pp. 1-4 (1977).

*Primary Examiner*—Benjamin R. Padgett
*Assistant Examiner*—T. S. Gron
*Attorney, Agent, or Firm*—Geoffrey H. Krauss; Joseph T. Cohen; Marvin Snyder

[57] ABSTRACT

Dichroic dyes of the 4,4'-Bis-(substituted naphthylazo)azobenzene type, each having three azo (—N=N—) bonding groups, provide a high order parameter in excess of 0.70, when dissolved in liquid crystal mixtures to provide contrast ratios on the order of 10:1.

2 Claims, No Drawings

DICHROIC LIQUID CRYSTAL COMPOSITION WITH 4,4-BIS (SUBSTITUTED NAPHTHYLAZO)AZOBENZENE DICHROIC DYES

BACKGROUND OF THE INVENTION

The present invention relates to dichroic dyes and, more particularly, to novel dichroic dyes of the (substituted naphthylazo) azobenzene type, each having three azo bonding groups and useful in a liquid crystal mixture for providing contrast ratios on the order of 10:1.

A display, particularly one of the liquid crystal type, can be characterized by brightness and contrast performance criteria. It is known to improve these performance criteria by dissolving a guest dichroic dye in a host liquid crystal material. Many dyes have been especially developed for a variety of applications such as dyeing of fabrics, printing of textiles, coloring of plastics, color image formation in photography, etc. To provide the requisite properties, such as hue, solubility, affinity for the substrate, chemical resistance, and compatibility with the medium from which the dye is applied, the molecular structure and bond rigidity of the dye are specially designed for each application. Important properties required for the present application in liquid crystal displays, include the following: dichroism, solubility and high order parameter.

Dichroism is the property whereby an oriented assembly of dye molecules exhibits relatively low absorption of a given wavelength of light in one state of orientation and a relatively high absorption of the same wavelength in another state of orientation with respect to the light source. The orientation can be brought about by dissolution of the dye in a liquid crystal solvent or by embedding the dye in a stretched plastic.

Solubility must be sufficiently high so that thin layers, for example, of ten micrometers, have adequate light absorption in one of the oriented states. Ionic dyes will generally be inadequate not only because of their low solubility but also because they increase the electrical conductivity of liquid crystals.

Order parameter is a quantitative measure of the degree of molecular order or alignment in a given system. High order parameter is promoted by dyes with elongated shape having a large ratio of molecular length to breadth, similar to the shape of the molecules of liquid crystal host material. To assure an elongated shape, the molecules should have a rigid structure which can be obtained, for example, by linking benzene or heterocyclic rings with double-bonded groups. The brightness and contrast of the display are both related to the order parameter S of the dye, where $S=(r-1)/(R+2)$ and R is the ratio of light absorption in the dye measured with a polarizer respectively parallel and perpendicular to the nematic director of the liquid crystal host at the wavelength of maximum absorption. Advantageously, the order parameter should be at least 0.70, and preferably as high as possible, to achieve a minimum desired contrast ratio on the order of 10:1, while still allowing a liquid crystal guest-host display to be fabricated with a reasonable brightness parameter.

BRIEF SUMMARY OF THE INVENTION

In accordance with the invention, dichroic dyes having an order parameter S of at least 0.70 comprise a relatively elongated and rigid molecule having three azo bonding groups linking cyclic substituents and having chromophoric end groups (auxochromes), e.g., electron-withdrawing groups or electron-repelling groups imparting a characteristic deep blue to purple color thereto by absorption over a specific portion of the visible light spectrum.

A first preferred dye is 4,4'-bis-(4-N,N-dimethylaminonaphthylazo)azobenzene having an order parameter of about 0.74 and a maximum absorption wavelength of about 555 nanometers (nm.), which dye appears to be colored violet when acting on white light.

Other preferred dyes include: 4,4'-bis-(4-methylaminonaphthylazo)azobenzene (having an order parameter of about 0.75 and a maximum absorption wavelength of about 595 nm.); 4,4'-bis-(4-ethylaminonaphthylazo)azobenzene (having an order parameter of about 0.72 and a maximum absorption wavelength of about 598 nm.); 4,4'-bis-(4-aminonaphthylazo)azobenzene (having an order parameter of about 0.74 and a maximum absorption wavelength of about 580 nm.); 4,4'-bis- (4,5-diaminonaphthylazo)azobenzene (having an order parameter of about 0.74 and a maximum absorption wavelength of about 595 nm.); 4,4'-bis-(2,2-methylethyl-2,3-dihydroperimidin-6-ylazo)azobenzene (having an order parameter of about 0.72 and a maximum absorption wavelength of about 610 nm.); and 4,4'-bis-(2,2-pentamethylene-2,3-dihydroperimidin-6-ylazo)azobenzene, having an order parameter of about 0.72 and a maximum absorption wavelength of about 605 nm.

These dichroic dyes exhibit relatively great resistance to bleaching when exposed to sunlight.

Accordingly, it is an object of the present invention to provide novel dichroic dyes having three azo bonding groups and having an order parameter in excess of 0.70.

It is another object of the present invention to provide novel high order parameter dichroic dyes having colors in the deep-blue-to-violet portion of the visible spectrum and highly resistant to sunlight bleaching.

These and other objects of the invention will become apparent from a consideration of the following detailed description.

DETAILED DESCRIPTION OF THE INVENTION

We have synthesized several dichroic dyes each having three azo (—N=N—) bonding groups and characterized by an order parameter S greater than 0.70 and by a maximum absorption wavelength in the range from about 555 nm. to about 610 nm., whereby a dichroic dye guest-liquid crystal host display cell generally having colors in the deep-blue to violet portion of the visible spectrum may be provided with contrast ratios (i.e., the ratio of the light observable in the brighter condition to the light observable in the darker condition) on the order of 10:1.

All seven of the high order parameter dichroic dyes are 4,4'-bis-(substituted naphthylazo)azobenzenes, having a generic chemical formula

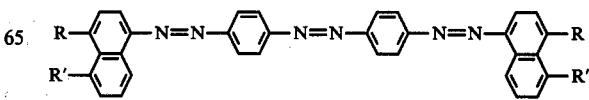

with the substituents R and R' being selected from the following table to yield the desired value of order parameters and of maximum attenuation wavelength (λmax.) and hence color:

| Dye | R | R' | S | λMax. (Approx.) | Color |
|---|---|---|---|---|---|
| 1 | N(CH₃)₂ | H | 0.74 | 555 | Violet |
| 2 | NHCH₃ | H | 0.75 | 595 | Blue |
| 3 | NHC₂H₅ | H | 0.72 | 598 | Blue |
| 4 | NH₂ | H | 0.74 | 580 | Purple |
| 5 | NH₂ | NH₂ | 0.74 | 595 | Blue |
| 6 | 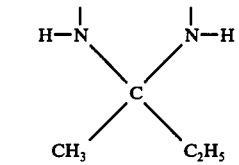 | | 0.72 | 610 | Deep Blue |
| 7 | 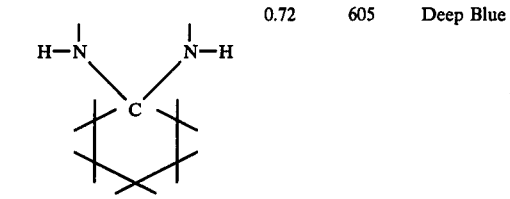 | | 0.72 | 605 | Deep Blue |

The selected dichroic dye is synthesized by tetrazotizing azodianiline and then coupling with two equivalents of an appropriate substituted-naphthalene derivative. The synthesis, typical of each of the seven dichroic dyes, for the first dichroic dye - 4,4'-bis-(4-N,N-dimethylaminonaphthylazo)azobenzene having a chemical formula

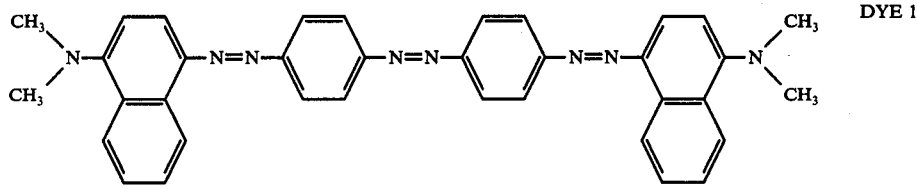

DYE 1 commences with the tetrazotization of azodianiline by dissolving 0.015 M (3.2)grams of azodianiline in a mixture of about 9 milliliters of hydrochloric acid and about 45 milliliters of water. The temperature of the resulting mixture is maintained at about 0° C. while adding about 2.25 grams of sodium nitrite in about 10 milliliters of water. The resulting clear tetrazonium solution is then coupled with about 0.03M of 1-N,N-dimethylaminonaphthalene, previously dissolved in acetic acid and cooled to a temperature of about 5° C. The coupling reaction product is then neutralized with potassium carbonate, poured into water and a precipitated product collected on filter paper.

The couplers for dichroic dyes 6 and 7 were prepared using a known method whereby the coupler, e.g. the 2,3-dihydro-2,2-dialkylperimidine coupler for dichroic dye 6, is cooled to about 15° C. prior to coupling with the tetrazotized azodianiline. The coupler itself may be prepared e.g., by heating about 4.5 gm. of 1,8-diaminonaphthalene with about 45 milliliters of water and about 3.3 gm. of concentrated sulfuric acid to about 70° C. for about 30 minutes. The resulting mixture is then cooled to about 10° C. and about 2.0 grams of methyl ethyl ketone added; after about 90 minutes, the mixture is warmed to about 50° C. and maintained at that temperature for about 60 minutes and then has about 300 milliliters of water added thereto. The coupler for dichroic dye 7 is prepared in similar manner.

The order parameter is measured by dissolving approximately 0.5% by weight of one of the novel dyes, disclosed herein, in a host nematic liquid crystal composition formed of a mixture of 70% by weight of p-pentylphenyl 2-chloro-4-(p-pentylbenzoyloxy)benzoate (available from Eastman Organic Chemicals as their compound EK-11650) and 30% by weight of a mixture of esters available from E. M. Merck and Co. as their compound ZLI-389, and apparently composed of approximately 50-60% by weight of 4'-n-pentylphenyl ester of anisic acid, 25-35% by weight of 4'-n-pentylphenyl ester of 4-hexyloxybenzoic acid, and 10-15% by weight of (2-cyano-4'-butylphenyl)ester of 4-(hexanoyloxybenzoyloxy)benzoic acid. The nematic mixture of this formulation possesses a large mesophase range with the nematic-to-isotropic transition temperature occurring at about 100° C. A test cell was constructed utilizing indium-oxide-coated glass substrates having surfaces coated with obliquely evaporated silicon oxide orientation layers, utilizing an incidence angle of 60° with respect to the substrate normal. The orientation layers provide unidirectional alignment of the molecules of the liquid crystal material and, generally, of the dichroic dye, parallel to the substrate planes. A 25 micron thick layer of the liquid crystal host-guest dye mixture is sealed between the substrates and order parameter is calculated from the measurement of light absorption with a polarizer respectively parallel and perpendicular to the nematic director of the liquid crystal material. The order parameter, maximum absorption wavelength and color (imparted to the liquid crystal display) is listed in the above table, for each of the seven dichroic dyes. The dichroic dyes were also dissolved and tested in other liquid crystal materials, such as the E-8 biphenyl mixture available from BDH Chemicals, Ltd. of England, with substantially no appreciable change in order parameter, wavelength of maximum absorption or solubility.

These novel dyes may find greater utility when combined with dichroic dyes having similarly high order parameters (greater than 0.65) and maximum absorption wavelengths yielding visible colors in other regions of the visible spectrum to prepare multi-dye mixtures characterized by light absorption spectra extending over substantially all of the visible wavelengths, whereby a "black" dye is achieved. Thus, one of the seven dichroic dyes herein may be combined with a red dichroic dye and a yellow dichroic dye (such as the high order parameter red and yellow dyes of our co-pending U.S. Applications Ser. Nos. (RD-721,668; 721,669; and 721,670, all filed on Sept. 9, 1976, now abandoned, and subsequently respectively replaced by continuation-in-part applications Ser. Nos. 802,358 (filed June 2, 1977); 814,468 (filed July 11, 1977); and 835,044 (filed Sept. 21, 1977)), to prepare a very high contrast ratio dichroic dye mixture.

As previously mentioned, the novel dichroic dyes set forth herein have relatively greater photostability, particularly to sunlight. Dissolved dye samples were continuously illuminated by a sunlamp, of intensity to approximate a 75:1 multiplication of noon sunlight which would impinge on a display using the dichroic dye (0.5% by weight in a liquid crystal material) if such display were utilized, e.g., in a wristwatch, in an out-of-doors environment. Each display was temperature-monitored and cooled, as necessary, to prevent heating beyond 90° F., whereby each hour of sunlamp exposure was equivalent to about 75 hours of continuous sunlight exposure.

Test cells were filled with one of three test mixtures, each utilizing a biphenyl host liquid crystal material (E-8, available from Gallard-Schlessinger Chemical Co.) and having one of the following dichroic dyes dissolved therein: Dye 2, Dye 3, or a commercially available tris-azo dye D-3 (also available from Gallard-Schlessinger Chemical Co.) as a control. Each cell was partially masked with black tape; a portion of the unmasked cell was further protected with an ultraviolet protective layer having less than 0.1% transmission for wavelengths below 375 nm. The cells were exposed to the sunlamp and visually inspected with polarized light after various exposure intervals; the time required for initial signs of "bleaching" were thus obtained, and are summarized in the following table:

| Dye/Host | SUNLIGHT EXPOSURE | | |
|---|---|---|---|
| | Initial Order Parameter | Stability to Accelerated Sunlight Exposure | To Accelerated Sunlight Stability Utilizing A UV Protective Layer |
| Commercially available Dye D-3 in E-8 Biphenyl (0.5% W/W) | 0.74 | Slight bleaching after 3 hours of continuous exposure (25% reduction in optical density). | Slight bleaching after 24 hours of continuous exposure. |
| Dye #2 in E-8 Biphenyl (0.5% W/W) | 0.75 | Slight bleaching after 50 hours. | No change after up to 260 hours of continuous exposure. S=0.75. |
| Dye #3 in E-8 Biphenyl (0.5% W/W) | 0.72 | Slight bleaching after 50 hours | No change after up to 330 hours of continuous exposure. S=0.72. |

It is seen that the novel dyes, disclosed herein, evaluate to at least a factor of ten better sunlight stability than the known tris-azo dye used as a control. Further, when a UV-protective layer is utilized (preventing transmission of wavelengths less than 375 nm.), no evidence of photodegradation was observed after an average of 300 hours of accelerated exposure.

While the present invention is described with reference to several preferred embodiments, other variations and modifications will now become apparent. It is our intention, therefore, to be limited only by the scope of the appended claims.

What is claimed is:

1. A dichroic dye dissolved in a nematic liquid crystal host material of positive dielectric anisotropy and imparting a blue color thereto, said dichroic dye-nematic liquid crystal mixture having a high degree of photostability; said dye being a 4,4'-Bis-(substituted naphthylazo)azobenzene with a general chemical formula:

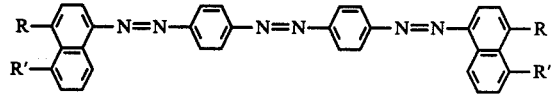

wherein the substituents at bonds R and R', are coordinately selected for a desired set of an approximate order parameter (S) and an approximate wavelength ($\lambda_{Max.}$) of maximum absorption in accordance with the following table:

| Dye | R | R' | S | $\lambda_{Max.}$ (nm.) |
|---|---|---|---|---|
| a | NHCH$_3$ | H | 0.75 | 595 |
| b | NHC$_2$H$_5$ | H | 0.72 | 598 |
| c | NH$_2$ | NH$_2$ | 0.74 | 595 |
| d | H—N\\C/CH$_3$ | N—H/C$_2$H$_5$ | 0.72 | 610 |
| e | H—N\\C | N—H/C | 0.72 | 605 | the approximate order parameter and approximate maximum absorption wavelength being measured with said dye dissolved in a host material consisting of a mixture of 70% by weight of p-pentylphenyl 2-chloro-4-(p-pentyl-benzoyloxy)benzoate, and 30% by weight of an ester mixture composed approximately of 50–60% by weight of 4'-n-pentylphenyl ester of anisic acid, 25–35% by weight of 4'-n-pentylphenyl ester of 4-hexyloxybenzoic acid, and 10–15% by weight of (2'-cyano-4'-butylphenyl) ester of 4-(hexanoyloxybenzoyloxy)benzoic acid.

2. A dichroic dye composition as set forth in claim 1, wherein about 0.5% by weight of said dye is dissolved in said liquid crystal material.

* * * * *